Figure 1:
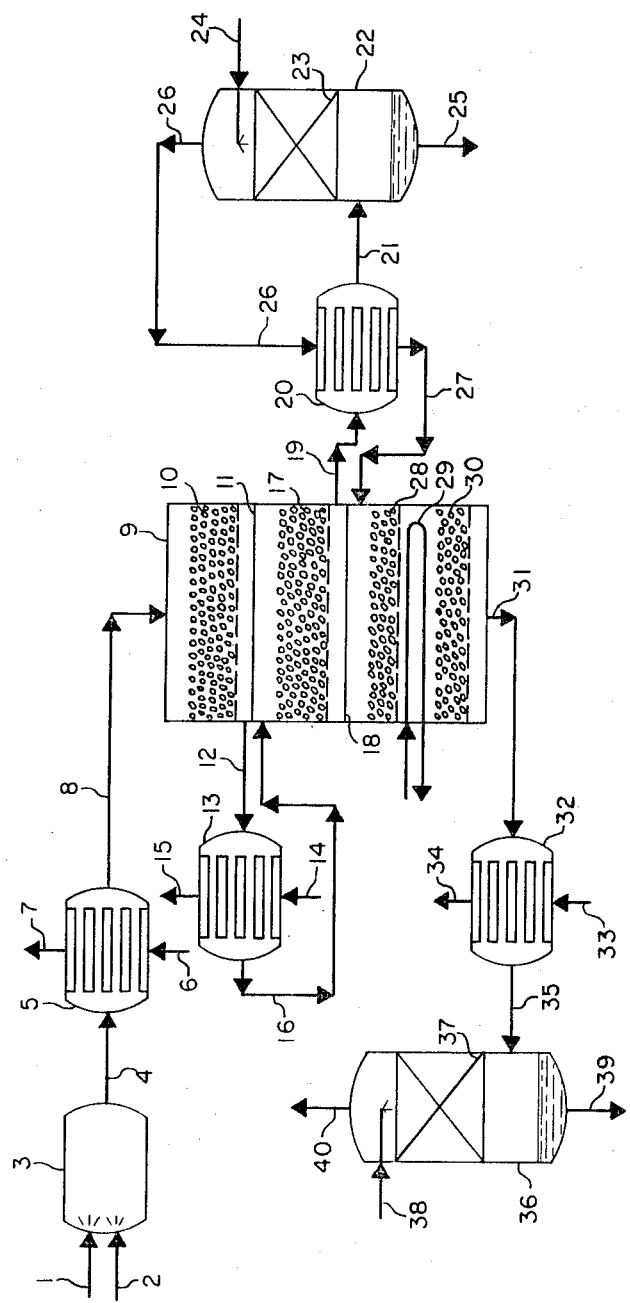

United States Patent
Connor et al.

[15] 3,653,828
[45] Apr. 4, 1972

[54] DUAL ABSORPTION SULFURIC ACID PROCESS

[72] Inventors: John M. Connor, New York, N.Y.; Krikor D. Gureghian, Teaneck, N.J.

[73] Assignee: Chemical Construction Corporation, New York, N.Y.

[22] Filed: Sept. 24, 1969

[21] Appl. No.: 860,519

[52] U.S. Cl. ................................23/168, 23/176
[51] Int. Cl. .................................C01b 17/76
[58] Field of Search ....................23/168, 175, 176

[56] References Cited

UNITED STATES PATENTS

| | | | |
|---|---|---|---|
| 1,789,460 | 1/1931 | Clark | 23/176 |
| 3,350,169 | 10/1967 | Rinckhoff | 23/168 |
| 3,404,956 | 10/1968 | Drechsel et al. | 23/168 |
| 3,525,587 | 8/1970 | Browder | 23/168 |
| 3,536,446 | 10/1970 | Maurer | 23/168 |

OTHER PUBLICATIONS

Djecker (editor), "The Manufacture of Sulfuric Acid" pages 164–168 (Reinhold 1959)

Primary Examiner—Oscar R. Vertiz
Assistant Examiner—Charles B. Rodman
Attorney—J. L. Chaboty

[57] ABSTRACT

A dual absorption sulfuric acid process is provided, with intermediate scrubbing of the process gas stream to remove sulfur trioxide, in which the residual gas stream after intermediate scrubbing is heated to a temperature which is about 10° C. to 50° C. higher than the temperature of the initial hot process gas passed into the first stage of catalysis. The sulfur dioxide content of the heated residual gas stream is thus catalytically oxidized to sulfur trioxide using reduced amounts of catalyst.

6 Claims, 3 Drawing Figures

Patented April 4, 1972

3,653,828

3 Sheets-Sheet 1

JOHN M. CONNOR
KRIKOR D. GUREGHIAN
INVENTORS.

BY J. T. Choloty
AGENT

JOHN M. CONNOR
KRIKOR D. GUREGHIAN
INVENTORS.

JOHN M. CONNOR
KRIKOR D. GUREGHIAN
INVENTORS.

DUAL ABSORPTION SULFURIC ACID PROCESS

BACKGROUND OF THE INVENTION

Field of the Invention

The invention relates to dual absorption processes for production of sulfuric acid, in which the initial hot process gas stream containing sulfur dioxide and oxygen is passed through one or more stages of catalysis for conversion of a portion of the sulfur dioxide to sulfur trioxide, the resulting gas stream containing sulfur trioxide, residual sulfur dioxide and residual oxygen is cooled and scrubbed with concentrated sulfuric acid or oleum to remove sulfur trioxide, the scrubbed gas stream is heated and subjected to further catalysis to convert residual sulfur dioxide to sulfur trioxide, and the resulting gas stream is cooled and scrubbed with concentrated sulfuric acid or oleum, so as to produce an effluent tail gas stream substantially free of sulfur oxides. The invention is also applicable to existing sulfuric acid production facilities in which objectionable amounts or concentrations of sulfur dioxide are present in the effluent tail gas. Such existing facilities may be converted to dual absorption processes according to the present invention, with resultant diminished discharge of sulfur dioxide to the atmosphere and curtailment of air pollution.

Description of the Prior Art

Sulfuric acid is generally produced by the oxidation or combustion of a sulfur-containing material such as elemental sulfur, hydrogen, sulfide, pyrites, sludge acid or the like, to produce a process gas stream containing sulfur dioxide and oxygen, which is passed at elevated temperature through one or more stages of catalysis in contact with a platinum or vanadium pentoxide catalyst, so as to oxidize sulfur dioxide to sulfur trioxide. The resulting gas stream is cooled and scrubbed with concentrated sulfuric acid or oleum, so as to produce further sulfuric acid or fortified oleum of greater sulfur trioxide concentration. A residual tail gas of law sulfur dioxide content is discharged to the atmosphere. Due to more stringent air pollution regulations promulgated in recent years, dual absorption sulfuric acid processes as described supra, which discharge a tail gas having negligible sulfur oxides content, have been developed. Dual absorption sulfuric acid processes are described in U.S. Pat. Nos. 3,432,263; 3,350,169; 1,789,460 and U.S. Pat. application No. 670,551 filed Sept. 26, 1967 and now issued as U.S. Pat. No. 3,536,446. Improvements in conventional sulfuric acid are described in U.S. Pat. Nos. 3,147,074; 3,455,652; 3,172,725 and U.S. Pat. application No. 626,489 filed Mar. 28, 1967 and now issued as U.S. Pat. No. 3,475,120.

SUMMARY OF THE INVENTION

In the present invention, an improved process of design and operation of a dual absorption sulfuric acid plant has been developed. The improvement arises from the fact that it has been determined that by operating the catalyst stages after the first absorption stage at a temperature which is higher than normal, typically with a difference above normal of about 10° C. to 50° C, the catalyst quantity required is appreciably reduced. This leads to a plant design which preferably has two stages of conversion before the first absorption stage and one or two further stages after the first absorption stage.

After the primary absorption stage of a dual absorption sulfuric acid plant, the ratio of oxygen to sulfur dioxide is very high compared to the values usually encountered in single absorption plants. In these circumstances, the composition of this gas at its thermodynamic equilibrium point varies only slightly with temperature in the range 425° C. to 480° C. and consequently within this range thermodynamic equilibrium effects on the rates of reaction are comparatively small, and the effect of temperature becomes much more important. For instance, a gas containing 1 percent sulfur dioxide and 6.5 percent oxygen supplied to a catalyst at 425° C. could theoretically come to equilibrium at about 460° when it contain approximately 0.032 percent sulfur dioxide. If the same initial gas was supplied to the catalyst at a higher temperature of 453° C. the equilibrium temperature would be 485° C. and the final sulfur dioxide content would be only slightly greater, 0.045 percent sulfur dioxide content at equilibrium. The quantity of catalyst required to reach any given final sulfur dioxide content would be much less at the higher initial temperature.

It has also been determined that 2/2 dual absorption systems, with two conversion stages before primary absorber and two more after the primary absorber, are more efficient in catalyst usage than 3/1 systems. Typically a 2/2 system using higher feed temperatures into the stages after primary absorption decreased catalyst volume to 65 percent of the amount required for the more usual lower temperature 3/1 process, for the same overall end conversion. The high temperatures 2/2 dual absorption system has the additional advantages of lower pressure drop through the system due to decreased depth of catalyst beds after the primary absorber. The reduced pressure drop lowers overall power consumption. The new system also reduces heat exchanger surface due to an increased temperature difference between the tube side inlet and shell side outlet streams of the primary absorber heat exchanger, as compared to a conventional 3/1 dual absorption system in which three catalytic stages are provided before primary absorption and one stage after.

From a design viewpoint, a dual absorption system is quite different from a once-through three or four bed converter. The once-through system is basically limited to one equilibrium conversion vs. temperature curve, calculated from the feed gas composition to the first bed. The higher the gas temperature, the lower the equilibrium conversion. Hence, it is necessary to cool the gas in between beds to a temperature at or close to the initial bed feed temperature. Once-through converter gas has to under-go cooling prior to succeeding beds to the same temperature of 425° C. to 440° C. for all the beds involved. However, dual absorption converters and processes have two equilibrium conversion CURVES. The curve prior to the first or primary absorber is similar to the once-through curve, differing only because of the increase in sulfur dioxide concentration, hence the same adverse high temperature effects on conversion. However, the equilibrium conversion curve for the gas after the first intermediate or primary absorber, when on the same scale as the original curve, is above the first curve and shows only a small reduction in conversion with increased temperatures. Hence, temperature effects on equilibrium conversion are not as significant. Thus, in a dual absorption system, it is possible to take advantage of using higher feed temperatures in the catalyst stages after primary absorption and thereby take advantage of the higher reaction rates thus obtained with resultant reduced catalyst requirements. It was determined that the typical scheme of operation for sulfur burning dual absorption plants is a four-stage converter, having two catalyst stages before primary absorption and two after, feed temperatures being about 420° C. 430° C., 455° C. and 455° C. for the first, second, third and fourth stages, respectively. None of the combinations of three to one dual absorption schemes proved as efficient as the arrangement involving two stages before primary absorption and two stages after.

There are a large number of existing once-through sulfuric acid plants designed originally for about 96 percent conversion and probably currently operating below this conversion rate, with resultant excessive sulfur dioxide discharge. These plants will not be permitted to continue operation under existing and pending air pollution control legislation. Some of the existing plants are in good condition and complete replacement is not justified.

The dual absorption system as applied to existing once-through sulfuric acid plants means that the sulfur trioxide formed in the existing two or three stages of conversion is absorbed, the tail gas is reheated, and the heated tail gas is passed through one or two additional new conversion stages before final absorption. Systems vary in the way the heat required for reheating the primary absorber tail gas is obtained, but in almost all cases this reheating requires some heat from the first conversion stages. If it were not for this reheat requirement, it would be a simple matter to modify an existing facility by adding a second conversion and absorption stage to any existing once-through sulfuric acid plant. In an existing acid plant, the relatively high temperature heat available in the gas discharged from the first conversion stage is used either to reheat inlet gas which has been cooled below reaction temperature in the burner gas steam boiler, or to generate steam directly in a waste heat boiler. The second stage heat is most usually removed by internal coils in the converter, through which air is circulated and heated, with the heated air being used in the sulfur burning furnace or wasted, or the internal coils may contain circulating boiler feed or condensate water which is heated and vaporized to produce usable superheated steam. The only other source of heat is the hot effluent gas from the sulfur furnace.

Some of the heat required to reheat the tail gas after the first absorption tower can be obtained from a feed/effluent exchanger on the secondary converter, but because of the lower temperatures and the need for reasonable temperature approaches in the exchangers, as well as the necessity for initially heating the plant, some of this heat must be obtained from a high temperature source, such as the primary converter gas or the sulfur burner gas.

When employing the primary converter gas as a high temperature heat source, the gas from the stack of the existing plant is pressurized by a blower and heated in a first heat exchanger by the gas leaving the secondary converter, and then further heated in a second exchanger using the gas from the first stage of the primary converter. The basic scheme includes a converter exchanger rather than a second boiler. On the hot gas side, the new exchanger is connected in parallel with the converter exchanger of the original plant. As the heat requirement of the new plant is obtained at the expense of the converter inlet gas of the old plant, this must be made up by opening the furnace gas steam boiler bypass damper, which in turn will reduce the steam production by the equivalent of the heat removed from the system. The new converter may be a single or two-stage unit, and the remainder of the added new plant includes the secondary absorption tower with its own acid circulation system and acid cooler, and connection to the acid system of the existing plant. In most instances, it is possible to use the converter gas-to-gas heat exchanger of the existing plant for the new duty, connecting the new converter inlet stream in place of the original converter inlet stream. The process gas inlet to the old or existing converter would then be taken directly from the furnace gas steam boiler outlet, and the additional heat would be obtained by boiler bypass. This modification results in a lower initial cost but a greater loss of steam production.

When employing the sulfur burning furnace gas as a high temperature heat source, the high temperature heat for final heating of the secondary converter inlet gas is obtained by mixing the tail gas, which may first be preheated by heat exchange with the secondary converter effluent gas, with hot gas produced at about 800° C. to 1,000° C. by the sulfur burning furnace. As this gas usually contains at least 10 percent sulfur dioxide and it bypasses the first converter and absorber, it usually becomes necessary to use a two-stage secondary converter to obtain the desired high overall sulfur dioxide conversion of 99.5 percent or higher. The advantage of this scheme is that it requires only one gas connection line to the existing plant, in addition to the inlet line from the stack, and this gas connection line for transferring hot sulfur burner gas for heating purposes although very hot need not be very large. An additional advantage arises because, since the hot gas addition bypasses the whole of the existing or base plant except the drying tower, furnace and blower, it is possible to increase the total plant capacity if these units will accommodate greater throughput. If the blower capacity is fully employed in the existing plant, the blower of the additional plant may be adjusted in capacity to overcome this restriction and permit greater overall throughput.

It is an object of the present invention to provide an improved process for producing sulfuric acid.

Another object is to provide an improved dual absorption sulfuric acid process, in which the dioxide-containing process gas stream trioxide, is a partially oxidized to sulfur trioxide, scrubbed with concentrated sulfuric acid to remove sulfur trioxide in a primary absorption step, and the residual gas is heated, further catalytically oxidized and scrubbed in a secondary absorption step.

A further object is to reduce catalyst requirements in a dual absorption sulfuric acid process.

An additional object is to reduce gas pressure drop through a sulfuric acid process.

An object is to provide reduced concentrations of sulfur dioxide in the tail gas discharged from a sulfuric acid process.

An object is to reduce the size of heat exchangers required for a dual absorption sulfuric acid process.

These and other objects and advantages of the present invention will become evident from the description which follows.

DESCRIPTION OF THE DRAWINGS AND PREFERRED EMBODIMENTS

Figure 2:
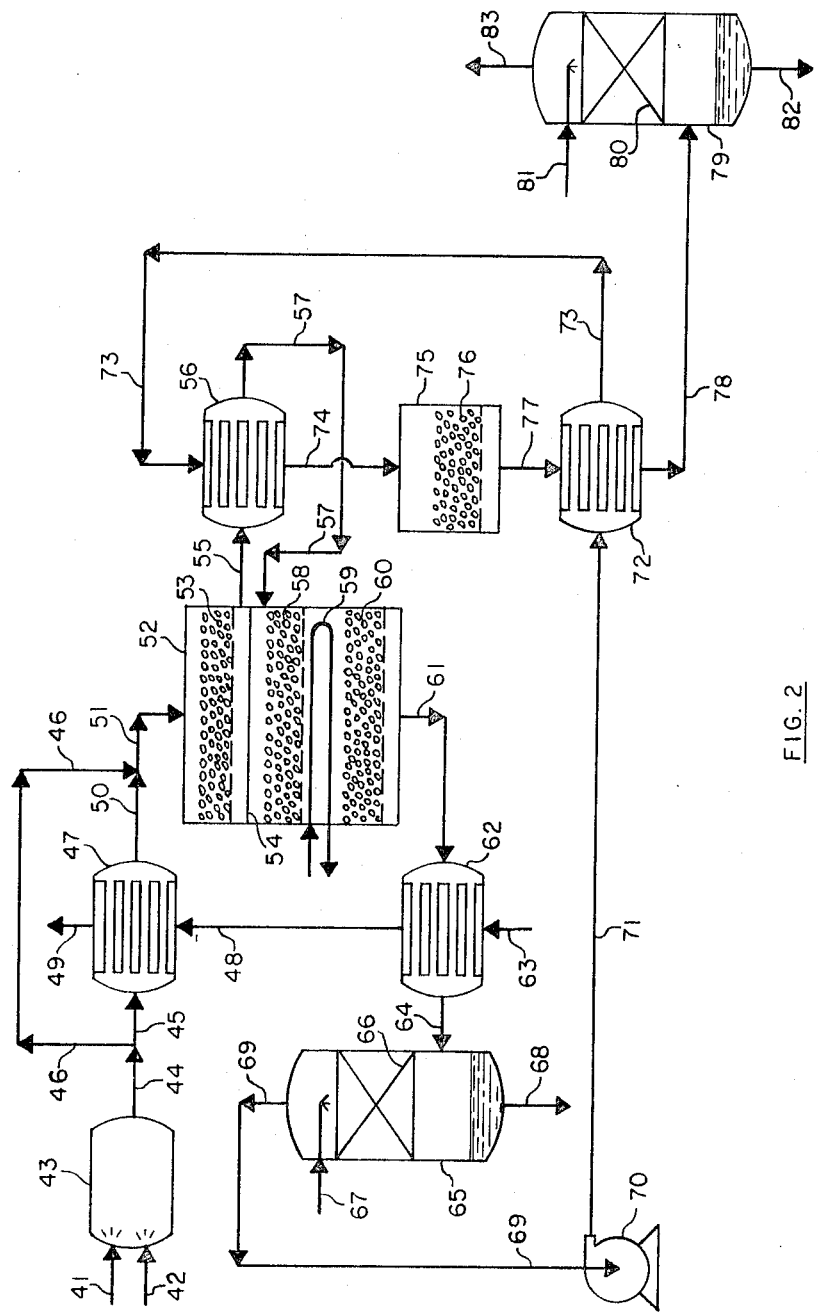
Figure 3:
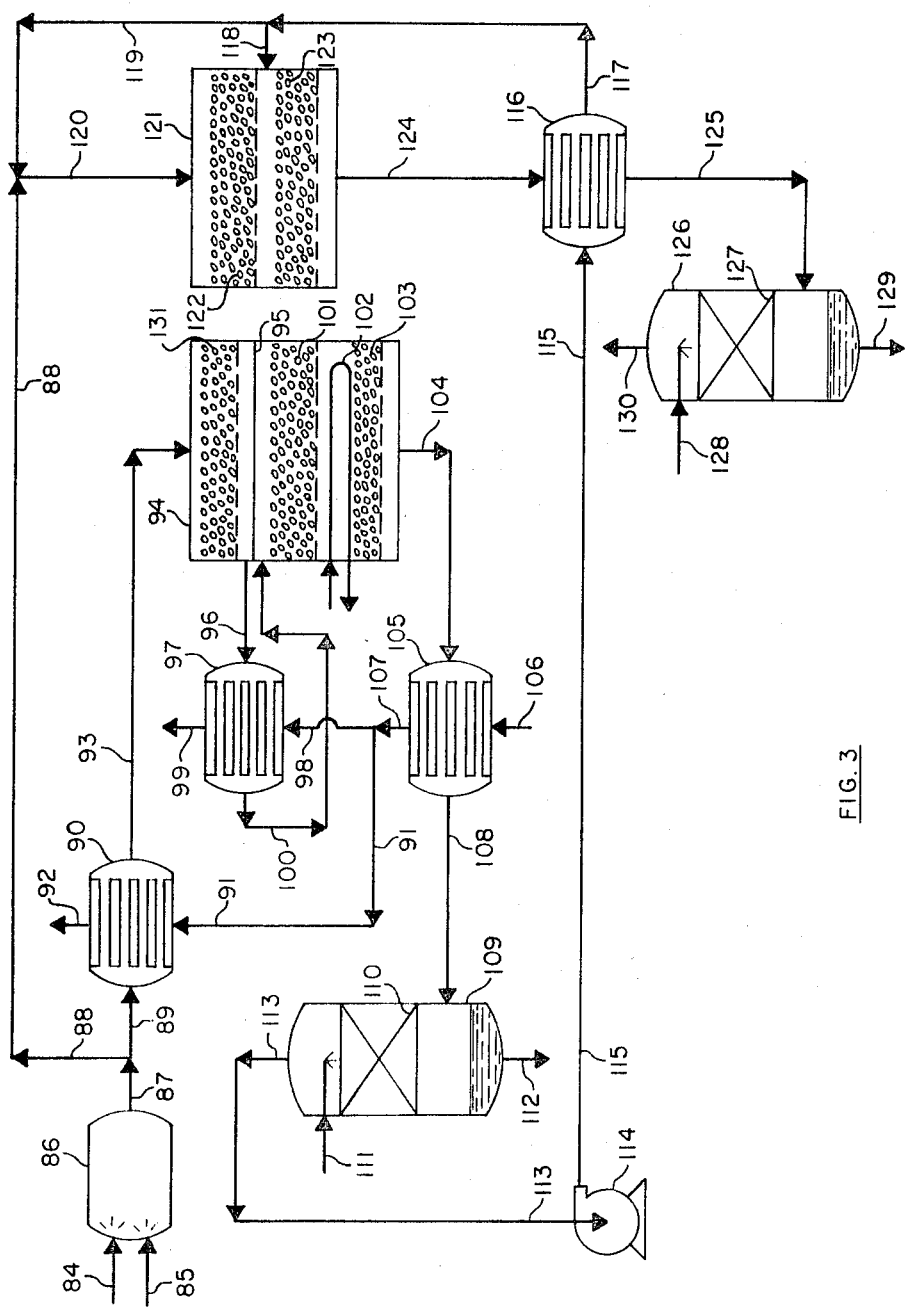

Referring now to the drawings,

FIG. 1 is a flowsheet of the process of the present invention in a preferred embodiment as applied to a new sulfuric acid production facility;

FIG. 2 shows an embodiment of the invention as applied to an existing once-through facility, in which reheat of the tail gas is accomplished by heat exchange with hot primary converter gas, and FIG. 3 illustrates an alternative embodiment of the invention as applied to an existing once-through facility, in which reheat of the tail gas is accomplished by direct injection of hot gas from the sulfur burning furnace.

Referring now to FIG. 1, sulfur stream 1 is burned with predried air stream 2 in sulfur burning furnace 3, which is generally a refractory-lined chamber. The resulting hot furnace gas stream 4 discharged from unit 3 is typically at a temperature in the range of 800° C. to 1,000° C. and usually contains about 8 percent to 14 percent sulfur dioxide content by volume, together with excess oxygen and inerts such as nitrogen. Stream 4 is cooled to the proper temperature for initial catalytic oxidation of sulfur dioxide to sulfur trioxide, by passing stream 4 through waste heat steam boiler 5. Boiler feed water or condensate water stream 6 is circulated through unit 5 in indirect heat exchange with stream 4, and the resultant generated and usually superheated steam is removed via stream 7.

The cooled process gas stream 8 discharged from unit 5 is now at a suitable temperature for initial catalysis, generally in the range of about 400° C. to 450° C. Stream 8 is passed into the upper end of catalytic converter 9, and the process gas flows downwards through catalyst bed 10, which is generally a suitable catalyst for the catalytic oxidation of sulfur dioxide to sulfur trioxide, such as platinum, vanadium oxide or the like. The reaction is exothermic, and the hot gas discharged below bed 10 must be cooled before further catalysis, by diverting the gas above partition 11, and removing the hot partially converted gas from unit 9 via stream 12, which is at a temperature generally in the range of 500° C. to 630° C. Stream 12 is cooled to a suitable temperature for further catalysis, by passing stream 12 through waste heat steam boiler 13. Boiler feed or condensate water stream 14 is circulated through unit 13 in indirect heat exchange with the hot process gas stream, and generated steam is removed via stream 15. The cooled process gas stream 16 is discharged from unit 13 at a temperature typically in the range of 400° C. to 450° C., and stream 16 contains sulfur trioxide, residual sulfur dioxide and oxygen, and inerts. Stream 16 is passed back into unit 9 below partition 11, and the process gas stream flows downwards through catalyst bed 17, which is generally similar in configuration and function to bed 10 described supra. Further catalytic oxidation of sulfur dioxide to sulfur trioxide takes place in bed 17, and the resulting hot gas mixture discharged below bed 17 at a temperature typically in the range of 450° C. to 550° C. now typically contains in the range of about 6 percent to 12 percent sulfur trioxide content by volume, 0.5 percent to 4 percent residual sulfur dioxide content, residual oxygen and inerts. The hot gas is diverted below bed 17 by partition 18, and removed from unit 9 above partition 18 via stream 19, which is now processed in accordance with one embodiment of the present invention.

Stream 19 is now passed through process gas-to-gas heat exchanger 20, and is cooled while reheating sulfur trioxide-free process gas by indirect heat exchange in accordance with the present invention. The cooled process gas stream 21 discharged from unit 20 is passed into gas scrubbing tower 22 below gas-liquid contact section 23, which may consist of a bed of spheres, saddles or rings packing or the like, or a plurality of bubble cap or sieve trays, or other suitable gas-liquid contact means. The rising gas phase in section 23 is scrubbed by a stream 24 consisting of concentrated sulfuric acid typically containing in the range of about 93 percent to 99 percent sulfuric acid content by weight. In other instances, stream 24 may consist of oleum. In any case, stream 24 is passed into unit 22 above section 23, and flows downwards countercurrent to the rising gas phase, and selectively absorbs sulfur trioxide from the gas phase in section 23, with resultant formation of further sulfuric acid or enriched oleum in solution. The resultant liquid phase collects in the bottom of unit 22 and is removed via stream 25, which is generally cooled and passed to product utilization. In most instances, a portion of stream 25 will be diluted with water or dilute sulfuric acid and the diluted acid or oleum will be recycled via stream 24.

The residual gas stream 26 removed from unit 22 above section 23 now contains residual sulfur dioxide and oxygen, together with inerts such as nitrogen, and stream 26 is now reheated in accordance with the present invention, by passing stream 26 through heat exchanger 20 and in indirect heat exchange with stream 19. The resulting reheated process gas stream 27 discharged from unit 20 is now at an elevated temperature above the temperature of stream 8. The temperature of stream 27 is generally about 10° C. to 50° C. higher than the temperature of stream 8, and this factor provides the advantages of the present invention as discussed supra. Stream 27 is passed into unit 9 below partition 18, and the process gas flows downwards through catalyst bed 28, which is generally similar in configuration and function to bed 10 described supra, except that bed 28 is of much reduced size or quantity of catalyst as compared to bed 10, for the reasons discussed supra. Additional conversion of sulfur dioxide to sulfur trioxide takes place in bed 28, with resultant temperature rise. The heated gas stream flows downwards from bed 28 and in contact with heat exchange coil 29, through which a cooling fluid such as process air or water is circulated. In some instances, pre-dried process air is circulated through coil 29, and the resulting heated air is employed as combustion air in furnace 3. In other instances, boiler feed or condensate water may be circulated through coil 29, with the resultant generation of usable steam. In any case, the process gas is cooled by coil 29, preferably to a temperature which is about 10° C. to 50° C. above the temperature of stream 8, and the cooled process gas next flows through the final catalyst bed 30. Bed 30 is of substantially diminished catalyst volume compared to bed 10, due to a higher gas inlet temperature as discussed supra. Final and substantially complete conversion of sulfur dioxide to sulfur trioxide takes place in bed 30, and the resultant process gas stream 31 discharged from unit 9 below bed 30 is now substantially free of sulfur dioxide.

Stream 31 now principally contains sulfur trioxide, residual oxygen and inerts, and will also contain a very minor residual proportion or trace of sulfur dioxide. Stream 31 is produced at a temperature generally in the range of 420° C. to 550° C., and stream 31 is cooled in waste heat steam boiler or economizer 32, by indirect heat exchange with boiler feed or condensate water, prior to final absorption of sulfur trioxide. Water stream 33 is circulated in boiler 32 external to the boiler tubes, and generated saturated steam or mixture of steam and water is removed via stream 34. The cooled process gas stream 35, now at a temperature generally in the range of 50° C. to 150° C., is passed into gas scrubbing tower 36 below gas-liquid contact section 37, which is generally similar in configuration and function to section 23 described supra. Concentrated liquid sulfuric acid stream 38, which generally contains in the range of about 93 percent to 99 percent sulfuric acid content by weight, is sprayed or otherwise dispersed into unit 36 above section 37, and flows downwards through section 37 countercurrent to the rising gas phase, thereby absorbing sulfur trioxide and forming further sulfuric acid solution by reaction between sulfur trioxide and water. The resulting concentrated liquid sulfuric acid phase is removed from the bottom of unit 36 via stream 39, and a portion of stream 39 may be cooled, diluted with water or dilute sulfuric acid, and recycled via stream 38. A final tail gas stream 40 substantially free of sulfur oxides is discharged from unit 36 above section 37, and in most instances stream 40 will be passed to a stack for atmospheric discharge. In instances when the process is operated at elevated pressure, stream 40 may be expanded through a gas turbine or the like to recover usable power.

Referring now to FIG. 2, one embodiment of an application of the process of the present invention to an existing or original once-through sulfuric acid plant is illustrated, in which reheat of the tail gas from the existing or original plant is accomplished in part by heat exchange of the tail gas with the hot effluent gas from the existing first stage of catalysis in an original plant heat exchanger. The basic chemical reactions and process conditions of the arrangement of FIG. 2 are generally comparable to the process of FIG. 1, and therefore the process sequence of FIG. 2 will only be described in general terms, except in portions of the sequence which vary from the FIG. 1 flowsheet. Sulfur stream 41 is burned with predried combustion air stream 42 in sulfur burning furnace 43 to form hot sulfur combustion effluent stream 44 which contains sulfur dioxide, oxygen and inerts such as nitrogen. Stream 44 is split into main portion 45 and bypass portion 46, which bypasses waste heat steam boiler 47 for temperature control. Stream 45 passes through unit 47 in heat exchange with preheated water or water-steam mixture stream 48, which is vaporized in unit 47 to form steam stream 49. A cooled process gas stream 50 is discharged from unit 47 and combined with hot bypass stream 46 to form stream 51 at a temperature generally in the range of 400° C. to 450° C.

Steam 51 is passed into converter 52 and through the initial catalyst bed 53, with resultant conversion of a portion of the sulfur dioxide in the gas phase to sulfur trioxide. The resultant hot partially converted gas stream, now at a temperature typically in the range of 500° C. to 630° C., is diverted by partition 54 and flows via stream 55 through gas-to-gas heat exchanger 56, in which the gas stream is cooled by indirect heat exchange with process tail gas, as will appear infra. The cooled intermediate process gas stream 57 discharged from unit 56 is now at a temperature typically in the range of 400° C. to 450° C, and stream 57 is suitable for further catalytic oxidation of sulfur dioxide to sulfur trioxide. Stream 57 is passed into converter 52 below partition 54, and flows downwards through catalyst bed 58. The heated gas formed by the catalytic oxidation in bed 58 is cooled by coil 59, and the gas next flows downwards through catalyst bed 60. The converted gas stream 61 removed from converter 52 below bed 60 is now at a temperature typically in the range of 420° C. to 550° C., and stream 61 contains sulfur trioxide, residual oxygen, inerts, and a minor residual proportion of sulfur dioxide.

Stream 61 is passed through economizer 62, which is basically a boiler feed or condensate water preheater in which the process gas stream is cooled prior to scrubbing for sulfur trioxide removal. Boiler feed or condensate water stream 63 is passed into unit 62 and is heated, with the resulting heated or partially vaporized water stream 48 being utilized as described supra. The resulting cooled process gas stream 64 discharged from unit 62 is passed into absorption tower 65 below gas-liquid contact section 66, and sulfuric acid or oleum stream 67 is sprayed downwards into section 66 and absorbs sulfur trioxide from the gas phase, with resultant concentrated sulfuric acid or oleum being removed via stream 68. The residual gas phase stream 69 removed from unit 65 above section 66 would be discharged to the atmosphere as tail gas in a conventional once-through plant consisting only of units 43, 47, 52, 56, 62 and 65.

In this embodiment of the invention, stream 69 is not discharged to the atmosphere, and increased sulfur dioxide recovery as sulfuric acid is attained together with diminished air pollution, by additional processing of stream 69 with added process units as will appear infra. Stream 69 is pressurized by circulating gas blower 70, and the gas stream 71 discharged from blower 70 is heated from an initial temperature generally in the range of 50° C. to 150° C. to an intermediate temperature typically in the range of 100° C. to 200° C. in gas-to-gas heat exchanger 72. The heated intermediate temperature gas stream 73 discharged from unit 72 is passed through heat exchanger 56 and is further heated, and the resulting hot process gas stream 74 discharged from unit 56 is now at an elevated temperature suitable for final catalytic conversion of sulfur dioxide to sulfur trioxide. In accordance with the present invention, stream 74 is at a higher temperature than stream 51, and stream 74 is typically produced at a temperature which is about 10° C. to 50° C. higher than the temperature of stream 51.

Stream 74 is passed into secondary converter 75, and final and substantially complete catalytic oxidation of sulfur dioxide to sulfur trioxide takes place in catalyst bed 76. The resulting hot process gas stream 77 discharged from unit 75 now contains sulfur trioxide, residual oxygen and inerts, and stream 77 is substantially free of sulfur dioxide. Stream 77 is passed through heat exchanger 72, and the resulting cooled gas stream 78 is passed into scrubbing tower 79 below gas-liquid contact section 80. Concentrated aqueous sulfuric acid stream 81 is sprayed or otherwise dispersed into unit 79 above section 80, and flows downwards through section 80 and absorbs sulfur trioxide from the gas phase. The resulting sulfuric acid stream 82 removed from the bottom of unit 79 is fortified with absorbed sulfur trioxide, which forms additional sulfuric acid in solution. The final tail gas stream 83 discharged from unit 79 above section 80 is substantially free of sulfur oxides, and stream 83 may now be safely discharged to atmosphere via a stack or the like, without causing air pollution. In instances when the process is operated at elevated pressure, stream 83 may be expanded through a gas turbine or other mechanical power recovery means in order to recover power prior to atmospheric discharge.

Referring now to FIG. 3, an alternative embodiment of an application of the process of the present invention to an existing or original once-through sulfuric acid plant is illustrated, in which reheat of the tail gas from the existing or original plant is accomplished in part by direct injection of hot sulfur combustion furnace effluent gas into the tail gas stream. The basic chemical reactions and process conditions of the arrangement of FIG. 3 are generally comparable to the processes of FIGS. 1 and 2, and therefore the process sequence of FIG. 3 will only be described in general terms, except in portions of the sequence which vary from the prior FIGS. 1 and 2 flowsheets. Sulfur stream 84 is burned with predried combustion air stream 85 in sulfur burning furnace 86 to form hot sulfur combustion effluent stream 87 at a temperature typically in the range of 800° C. to 1,000° C. Stream 87 usually contains about 8 percent to 14 percent sulfur dioxide content by volume, together with excess oxygen and inerts such as nitrogen. Stream 87 is split into bypass portion 88, which is utilized for tail gas reheat in accordance with the present invention, and the main process gas portion stream 89, which is cooled in waste heat steam boiler 90. Hot boiler feed or condensate water stream 91 is passed into unit 90 and generated saturated or superheated steam stream 92 is removed from unit 90 and passed to any various stream usages, such as for process stream heating in ancillary facilities, or for feed steam turbine drives for process pumps or blowers.

The cooled process gas stream 93 discharged from unit 90 is now at a temperature typically in the range of 400° C. to 450° C., and is suitable for initial catalysis in the original plant converter. Stream 93 passes into the top of converter 94 and flows downwards through the uppermost catalyst bed 131. The resulting hot partially converted gas stream discharged downwards from bed 131 is diverted by partition 95 and removed from unit 94 via stream 96, which flows through waste heat steam boiler 97. Hot boiler feed or condensate water stream 98 is passed into unit 97 in indirect heat exchange with the hot process gas, and generated steam is removed via stream 99 and passed to usages as describes supra. The cooled process gas produced by unit 97 is discharged via stream 100, which is now at a temperature typically in the range of 400° C. to 450° C. Stream 100 is passed into unit 94 below partition 95, and flows downwards through catalyst bed 101. The resulting heated process gas is cooled by coil 102 and flows through lower catalyst bed 103, which is the final catalyst bed of the original converter 94. The hot converted gas is removed from the bottom of unit 94 via stream 104, which contains sulfur trioxide, residual oxygen and inerts, and a minor residual proportion of sulfur dioxide.

Stream 104 is cooled in economizer 105, by indirect heat exchange with boiler feed or condensate water stream 106 which is circulated through unit 105 and removed via stream 107 as heated or partially vaporized water. Stream 107 is divided into streams 91 and 98. The cooled process gas is removed from unit 105 via stream 108, which is passed into gas scrubbing and sulfur trioxide absorption tower 109 below gas-liquid contact section 110. Concentrated sulfuric acid or oleum stream 111 is sprayed or otherwise passed into unit 109 above section 110, and flows downwards through section 110 and absorbs sulfur trioxide, with resultant formation of further sulfuric acid or fortified oleum in the liquid phase, which is removed from the bottom of unit 109 via stream 112. The residual scrubbed gas phase removed from unit 109 above section 110 as stream 113 would have previously constituted a tail gas in the existing process facility consisting of units 86, 90, 94, 97, 105 and 109, however stream 113 is further processed in accordance with the present invention as will appear infra, in order to recover residual sulfur dioxide in an improved manner as sulfuric acid.

Stream 113 is pressurized by gas circulation blower 114, and discharged via stream 115, which flows through gas-to-gas heat exchanger 116 for heating from an initial temperature typically in the range of 50° C. to 150° C. to an intermediate elevated temperature typically in the range of 100° C. to 200° C. The resulting heated intermediate temperature gas stream 117 discharged from unit 116 is divided into a minor quench portion 118 and a major portion 119, which is combined with hot gas stream 88 to form a combined gas stream 120 at a suitable temperature quench further catalysis. In accordance with the present invention, the addition of hot gas stream 88 to stream 119 heats stream 119 and forms stream 120 at a temperature which is generally above the temperature of stream 93, and the temperature of stream 120 is specifically 10° C. to 50° C. above the temperature of stream 93. Stream 120 flows into the secondary converter 121 and downwards through the upper catalyst bed 122, with resultant conversion of a major portion of the sulfur dioxide content of stream 120 to sulfur trioxide. The resultant gas stream discharged below bed 122 at an elevated temperature is quenched to a lower temperature suitable for further catalysis by the addition of colder quench gas stream 118, which mixes with the hot gas below bed 122 and lowers the overall gas temperature to a level preferably above the temperature of stream 93 and typically 10° C. to 50° C. above the temperature of stream 93. The combined gas stream flows downwards through bed 123, in which final and substantially complete catalytic oxidation of sulfur dioxide to sulfur trioxide is attained. The hot fully converted gas stream 124 discharged from unit 121 below bed 123 is cooled in heat exchanger 116, and the cooled fully converted gas stream 125 discharged from unit 116 passes into sulfur trioxide absorption tower 126 below gas-liquid contact section 127. Concentrated sulfuric acid stream 128 is sprayed into unit 126 above section 127 and flows downwards in contact with the rising gas phase, thereby absorbing sulfur trioxide and forming further sulfuric acid in solution. The liquid phase consisting of further concentrated sulfuric acid discharged below section 127 is removed from unit 126 above section 127, and stream 130 is substantially free of sulfur oxides and is suitable for discharge to the atmosphere via a stack or the like. In instances when the process is operated at elevated pressure, stream 130 may be expanded through a gas turbine or other mechanical power recovery means prior to discharge to the atmosphere.

Numerous alternatives within the scope of the present invention, besides those mentioned supra, will occur to those skilled in the art. The ranges of process variables such as temperature and concentrations of components in process streams constitute preferred embodiments of the invention for optimum utilization of the process, and the invention may be practiced outside of these ranges in suitable instances, except that the residual gas stream after primary absorption will generally be heated to a temperature which is about 10° C. to 50° C. above the temperature of the initial gas stream passed to the first stage of catalysis, prior to passing the residual gas stream through the final catalytic stage or stages. The invention is generally applicable to a single stage or a plurality of stages of catalysis prior to intermediate or primary absorption, and a single stage or a plurality of stages of catalysis after primary absorption, however as discussed supra optimum results are attained with two stages before and two stages after primary absorption. The initial sulfur dioxide containing process gas stream may be derived from any or a combination of diverse sulfur sources or sulfur-containing materials besides elemental sulfur per se, such as sludge acid derived from chemical processing or petroleum refining, pyrites or sulfide minerals, hydrogen sulfide gas or the like. In instances when such raw materials as sludge acid or hydrogen sulfide are burned or otherwise oxidized to yield a gas stream containing sulfur dioxide, this gas stream must be cooled and scrubbed with concentrated sulfuric acid in order to remove water vapor which is concomitantly formed during combustion, prior to passing the process gas stream to the first stage of catalysis, in order to prevent the formation of a sulfuric acid mist during catalysis. In some instances, the hot sulfur combustion effluent gas stream may be cooled in steam boilers such as units 5, 47 or 90 to a final temperature below the optimum temperature for initial catalysis. In this case, a hot gas bypass may be provided, as for example stream 46 in FIG. 2, or the cooled process gas may be reheated prior to initial catalysis by indirect heat exchange with the hot effluent gas from the initial stage of catalysis. In the embodiment of the invention shown in FIG. 2, the heat exchanger 56 when originally operated in the existing plant will usually have been a steam boiler or steam generating facility, and the modification of the existing facility to dual absorption will reduce this steam production, since process gas stream 73 is not passed through unit 56 in indirect heat exchange, rather than boiler feed or condensate water.

An example of an application of the concepts the present invention to the design of a typical industrial size facility will now be described.

EXAMPLE

The composition of the tail gas that would result from burning 100 mols of sulfur in air to form a gas containing 10 percent sulfur dioxide, treating this gas in a conventional contact plant converter so as to convert 91 percent of the sulfur dioxide to sulfur trioxide and absorbing the sulfur trioxide so formed is:

| Sulfur dioxide | 9.0 mols/hour |
|---|---|
| Oxygen 64.5 mols/hour | |
| Nitrogen | 790.0 mols/hour |

If this tail gas is treated in a two-stage converter with means for cooling the gas between stages in such a manner that 90 percent of the sulfur dioxide is converted to sulfur trioxide in the first stage and an additional 50 percent of the residual sulfur dioxide is converted in the second stage, so that of the original 100 mols of sulfur fed to the plant, all but 0.45 mols are converted to sulfur trioxide, then the quantity of catalyst required in this second converter will depend on the gas temperature at the inlet to each stage as follows:

| Temperature at inlet to each stage, °C | 429 | 454 |
|---|---|---|
| Liters of catalyst - Stage 1 | 4,670 | 3,050 |
| Liters of catalyst - Stage 2 | 3,560 | 1,030 |
| Liters of catalyst Total catalyst | 8,230 | 4,080 |

It is clearly evident that substantially less catalyst is required at the higher inlet temperature of 454° C. The actual quantities of catalyst in a specific instance will depend on the actual catalyst used. In the comparison data presented supra, the proposed catalyst is vanadium pentoxide deposited on and mixed with diatomaceous earth and other materials.

Conventionally, a double absorption sulfuric acid plant has three stages before the primary absorption stage and one stage after. It has been determined that, by employing the temperature effect of the present invention, it is preferable to have two stages before the primary absorber and two stages after. Thus, taking the same gas as described above and containing 100 mols sulfur dioxide, 110 mols oxygen and 790 mols nitrogen, the catalyst quantities required for the two methods are as follows:

| | Conventional Dual Absorption | | New High Temperature Dual Absorption | |
|---|---|---|---|---|
| | Inlet Temp. °C | Liters of Catalyst | Inlet Temp. °C | Liters of Catalyst |
| 1st Stage | 427 | 2,800 | 427 | 2,800 |
| 2nd Stage | 432 | 5,620 | 432 | 5,620 |
| 3rd Stage | 432 | 8,850 | 454 | 3,050 |
| 4th Stage | 430 | 4,300 | 454 | 1,030 |
| Total catalyst | | 21,570 | | 12,500 |

In the conventional case, the first or primary absorber is after Stage 3, and in the new high temperature case according to the present invention, the first absorber is after Stage 2. It is clearly evident that substantially less catalyst is required in the new scheme, due to the provision of higher inlet gas temperatures in the 3rd and 4th Stages.

If the maximum practicable conversion is required, the gas temperature into the last stage of the new process of the present invention as shown supra may be reduced to 432° C. when with 4,000 liters of catalyst, an overall conversion of 99.75 percent may be reached. The total catalyst is still only 15,600 liters, which is appreciable less than in the conventional case which gives only 99.5 percent conversion.

We claim:

1. In a process for producing sulfuric acid in which an initial hot process gas stream containing sulfur dioxide and oxygen is passed through a first plurality of catalyst beds at elevated temperature, whereby a portion of the sulfur dioxide content of said gas stream is catalytically oxidized to sulfur trioxide in each of said first plurality of beds, said gas stream being cooled after each bed, the cooled gas stream containing sulfur trioxide, residual sulfur dioxide and residual oxygen produced after the last of said first plurality of beds is scrubbed with a first stream of concentrated sulfuric acid, whereby sulfur trioxide is removed from the gas stream and a scrubbed intermediate gas stream containing residual sulfur dioxide and oxygen is produced, said intermediate gas stream is heated, the heated intermediate gas stream is passed through a second plurality of catalyst beds at elevated temperature, whereby a portion of the residual sulfur dioxide content of said intermediate gas stream is catalytically oxidized to sulfur trioxide in each of said second plurality of beds, said gas stream being cooled after each bed, and the cooled gas stream containing sulfur trioxide, residual sulfur dioxide and residual oxygen produced after the last of said second plurality of beds is scrubbed with a second stream of concentrated sulfuric acid, whereby sulfur trioxide is removed from the gas stream and a scrubbed final gas stream having low residual sulfur dioxide content is produced, the improvement which comprises a. heating said intermediate gas stream by indirect heat exchange with the hot gas stream discharged from the last of said second plurality of catalyst beds, whereby said hot gas stream is cooled,
b. dividing the heated intermediate gas stream formed by step (a) into a first portion and a second portion,
c. adding a hot sulfur combustion effluent gas stream to the first portion of said intermediate gas stream, whereby said first portion is heated and a combined gas stream is formed at an elevated temperature which is about 10° C. to 50° C. higher than the temperature of said initial hot process gas stream,
d. passing said combined gas stream into the first of said second plurality of catalyst beds, and
e. adding said second portion of said intermediate gas stream to the partially reacted gas stream between successive catalyst beds of said second plurality of catalyst beds, whereby said partially reacted gas stream is cooled to a temperature which is about 10° C. to 50° C. higher than the temperature of said initial hot process gas stream.

2. The process of claim 1, in which the number of catalyst beds in said second plurality of catalyst beds is two.

3. The process of claim 1, in which said initial hot process gas stream is at a temperature in the range of 400° C. to 450° C., prior to passing through said first plurality of catalyst beds.

4. The process of claim 1, in which said first and second streams of concentrated sulfuric acid contain in the range of about 93 to 99 percent sulfuric acid content by weight.

5. The process of claim 1, in which said first stream of concentrated sulfuric acid is oleum.

6. The process of claim 1, in which said initial hot process gas stream is produced by burning sulfur with predried air to form a combustion effluent gas stream, and said combustion effluent gas stream is cooled to a temperature in the range of 400° C. to 450° C. to form said initial hot process gas stream.

* * * * *